Figure 1:
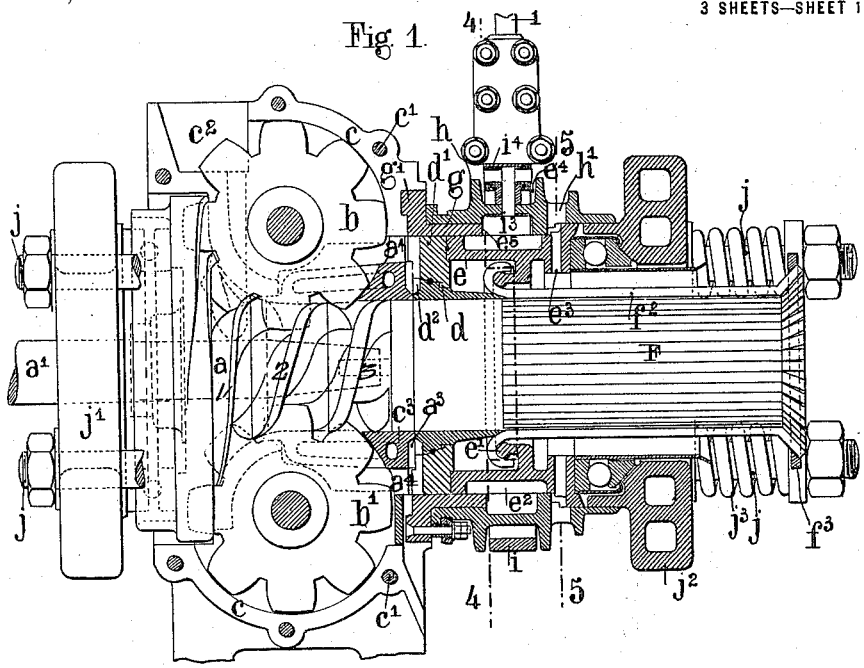

L. PENKALA.
MACHINE OR PRESS FOR MOLDING PLASTIC MATERIALS.
APPLICATION FILED MAY 12, 1911.

1,163,448.

Patented Dec. 7, 1915.
3 SHEETS—SHEET 1.

WITNESSES
J.P. Davis
P.D. Rollhaus

INVENTOR
LADISLAS PENKALA
BY Munn & Co.
ATTORNEYS

L. PENKALA.
MACHINE OR PRESS FOR MOLDING PLASTIC MATERIALS.
APPLICATION FILED MAY 12, 1911.

1,163,448.

Patented Dec. 7, 1915.
3 SHEETS—SHEET 2.

WITNESSES
J. P. Davis
J. D. Rollhaus

INVENTOR
LADISLAS PENKALA
BY
Munn & Co.
ATTORNEYS

L. PENKALA.
MACHINE OR PRESS FOR MOLDING PLASTIC MATERIALS.
APPLICATION FILED MAY 12, 1911.

1,163,448.

Patented Dec. 7, 1915.
3 SHEETS—SHEET 3.

WITNESSES

INVENTOR
LADISLAS PENKALA
BY
ATTORNEYS

UNITED STATES PATENT OFFICE.

LADISLAS PENKALA, OF BOIS-COLOMBES, FRANCE.

MACHINE OR PRESS FOR MOLDING PLASTIC MATERIALS.

1,163,448.

Specification of Letters Patent.

Patented Dec. 7, 1915.

Application filed May 12, 1911. Serial No. 626,743.

*To all whom it may concern:*

Be it known that I, LADISLAS PENKALA, a subject of the Emperor of Russia, and a resident of 16 Rue Pierre Joigneaux, at Bois-Colombes, Department of Seine, France, have invented certain new and useful Improvements in Machines or Presses for Molding Plastic Materials, of which the following is a specification.

This invention has reference to a press for molding plastic materials based on the known principle of the combination of a conoidal worm or screw with two gear wheels engaged in its convolutions for conveying the material, while successively compressing its particles and bringing it to the mouth of the press to be molded in an almost dry condition. Although the principle of this kind of press has been already proposed, it has not hitherto been possible to carry the same into practical effect owing to the difficulties resulting from the state of dryness of the material, which by friction on the walls of the mold encounters a variable resistance to its progress, which may cause the choking of the machine and consequently occasion an internal pressure that may even lead to breakage of the machine. In the presses actually in use based on the cylindrical worm this inconvenience is avoided by maintaining the pressure of the screw on the material by a spring, counterweight or the like so that when the pressure of the material is too great, the said screw yields longitudinally, or by allowing the case being filled to slide off the end of the screw casing as the material is being forced therein, against the action of a thread or friction brake. The former method cannot be employed with the conoidal screw because the position of the latter must be fixed in relation to the gear wheels with which it engages, while the latter method has been applied only to the filling of cases which are successively removed after filling and with only slight compression.

The present invention has now for its object the transfer to beyond the screw-mold or matrix the regulation of the pressure which it is desired to give to the material before its introduction into the matrix and of limiting this pressure to a maximum by enabling the matrix to yield longitudinally when the material accidentally acquires a pressure which should not be exceeded. The first of these results is obtained by submitting the material behind the matrix to an adjustable resistance afforded by a second matrix forming an extension of the screw mold and the lateral pressure of which on the material can be varied as desired. The second result is obtained by maintaining the matrix against the mouth of the press by an arrangement of counter-weights or the like, which allows the mold to withdraw from the mouth of the press when the maximum pressure assigned to the material is accidentally exceeded, the material then escaping between the mold and the mouth of the press so as to be automatically returned to the press by any suitable device. Owing to the dryness and the compression of the material it is impracticable to cut it with a knife as in the presses hitherto employed. The cutting off of the material is consequently effected by a sudden relative rotation of the matrix with respect to the mouth of the press around their common axis. The compression of the material by the conoidal screw produces toward the end of the latter a gradually progressive wearing away of its convolutions and of the corresponding portion of the casing forming the mouth. In order partly to remedy this drawback an easily and rapidly interchangeable casing has been provided as well as a screw formed by several parts simply threaded together and fastened the one after the other to the driving shaft. This arrangement permits of easily and rapidly changing the worn part of the screw and of continuing to use its other portions.

The accompanying drawings show various applications of the invention to a conoidal screw press for molding briquets.

Figure 2:
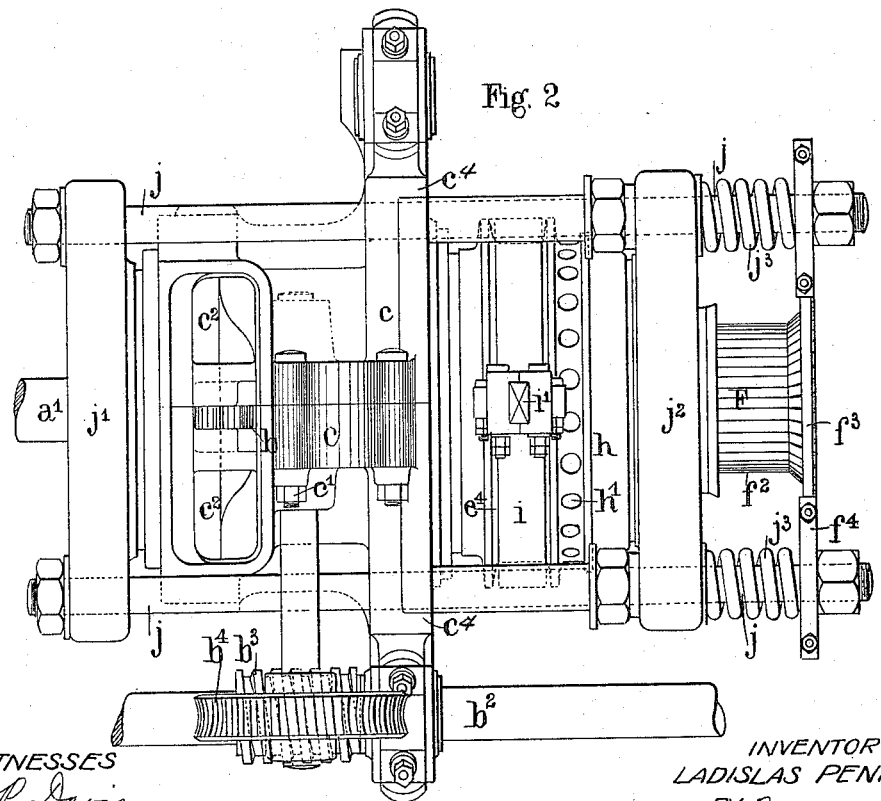
Figure 3:
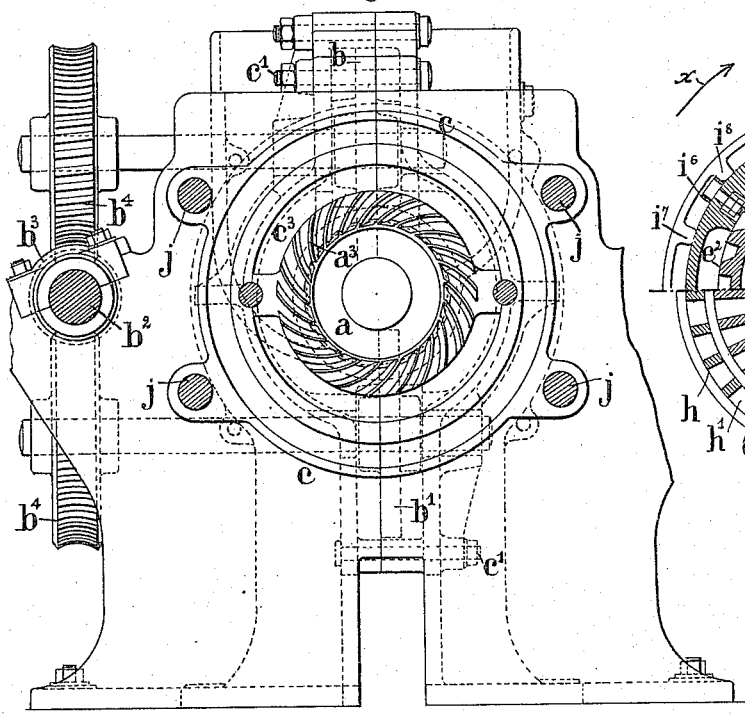
Figure 5:
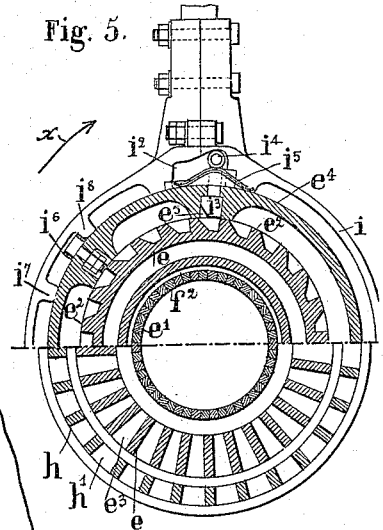
Figure 4:
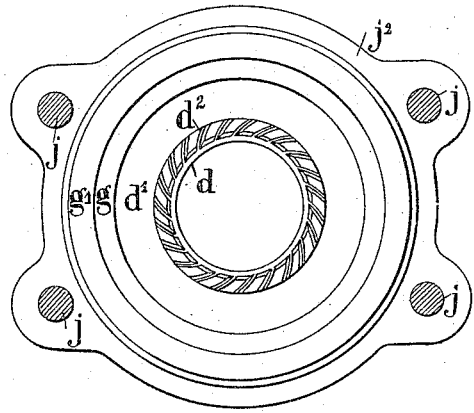
Figure 6:
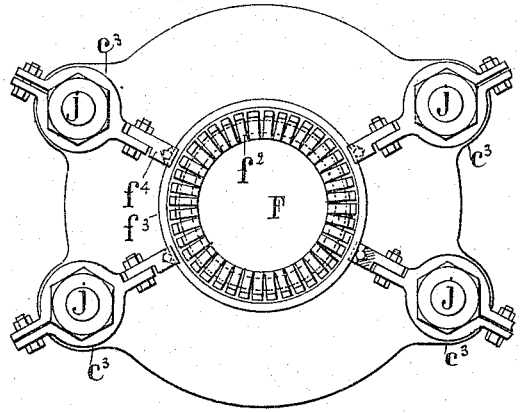
Figure 9:
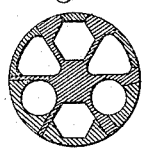
Figure 8:
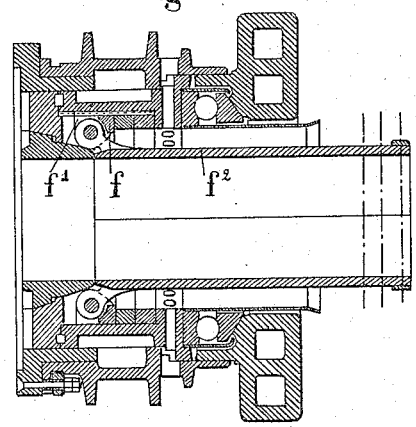
Figure 7:
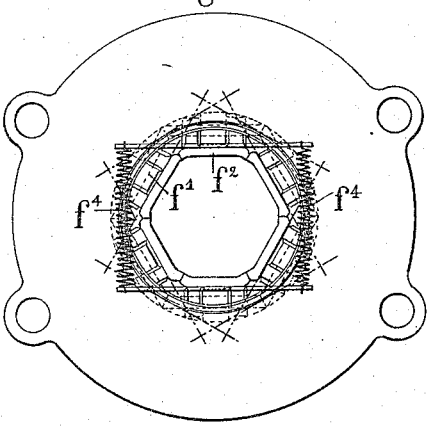

Figure 1 shows in longitudinal section the application of a constant pressure screw mold or matrix of circular section combined with a variable pressure matrix-extension, their yielding extension with the mouth of the press, the method of cutting the briquet by a relative rotation of the mold with respect to the mouth of the press, the arrangement for returning the material to the press and finally the combination of the interchangeable casing and of the conoidal screw divided into several parts as well as the mounting of the latter. Fig. 2 is a corresponding plan. Fig. 3 is an end view of the mouth of the press showing the arrangement for returning the material to the press when the matrix has been longitudinally displaced owing to excessive pressure. Fig. 4 shows an end view of the corresponding arrangement of the matrix for returning the material to the press. Fig. 5 shows two half cross sections taken along the lines 4—4 and 5—5 of Fig. 1 showing the arrangement of the pawl lever effecting the rotation of the matrices for cutting off the briquet. Fig. 6 is an end view of the variable pressure matrix extension showing the arrangement which permits of its yielding laterally, while at the same time the matrix yields longitudinally. Fig. 7 is an end view showing a variable pressure matrix extension of hexagonal section and capable of yielding to lateral pressure independently of the longitudinal displacement of the matrices. Fig. 8 is a longitudinal section of the same. Fig. 9 is a cross section of a multiple matrix extension for variable pressure.

Referring to Figs. 1 to 6 the press consists of a conoidal screw $a$ (or globic worm or screw, $i.\ e.$ a screw representing the helix described upon the surface of a globoid or torus), combined with two gear wheels $b\ b'$ inclosed in an outer casing $c$ of two parts connected together by bolts $c'$ and in the upper part of which are provided two apertures $c^2$ for the introduction of the material. The worm is driven by a shaft $a'$ suitably actuated, while the gear wheels $b\ b'$ are also rotated perpendicularly to the screw $a$ by a shaft $b^2$ parallel to the shaft $a'$, worm $b^3$ and worm gears $b^4$. The outer casing $c$ is adapted at the interior for suitably conveying the material between the core of the screw $a$ and the gear wheels $b\ b'$ and for leading it to the mouth of the press for the purpose of being molded. Since the compression of the material increases more and more on approaching the end of the screws $a$, toward the mouth of the press, there results an unequal wearing away of the different parts of the screw, the end of which is rapidly worn out as well as the corresponding part of the casing, whereas the other parts might still be utilized: the replacement of the whole thus entails a considerable loss. This disadvantage is avoided by forming the screw in three parts as clearly shown in Fig. 1 and numbered 1, 2 and 3 respectively. The screw taken as a whole comprises a hub and a helical flange, the latter of which, in addition to being in three parts, is progressively reinforced, that is it is gradually thickened toward its inner end and the inner end of the shaft $a'$ to which the screw parts are secured, the screw part 3 having a flange which is considerably thicker than that of the part 1, as will also be clearly seen by an inspection of the figure mentioned. It will be noted, however, that the part 3 of the screw and its respective portion of the thread are of substantially the same diameter throughout and that the said thread portion, carried by this screw part is of substantially the same thickness throughout. The interior part of the casing corresponding to the mouth of the press is formed by a separate part $c^3$ merely slipped in to the end of the press. Thus the casing part $c^3$ and the various parts of the screw $a$ can be easily and rapidly replaced as they become worn, which affords at the same time a considerable economy and much greater regularity in output. The matrix $d$ is connected to a plate $d'$ which latter is connected to a cylindrical part $e$ provided either with a ring $e'$ (Fig. 1) or with a ring $f$ having hinges $f'$ (Figs. 7 and 8), to which are pivoted blades $f^2$ forming the variable pressure matrix-extension F and constituting the direct prolongation of the constant pressure matrix $d$. These blades $f^2$ may be joined as shown in Figs. 1, 2, 5, 6 and 7 or separated from each other and arranged to form different profiles corresponding to the shape of the briquet; and the latter may have grooves formed on their periphery by corresponding projections upon the said blades. The part $e$ is provided on the exterior with ribs $e^2$ and with radial holes $e^3$. A cylinder $g$ is passed loosely over the plate $d'$ and the part $e$, its flange $g'$ engaging in a corresponding groove in the casing $c$. A second cylinder $h$ provided with holes $h'$ corresponding to the holes $e^3$, is passed loosely over the cylinder $g$ and the part $e$, said openings $h'$ and $e^3$ permitting the escape of any material which may be forced between the blades $f^2$. Two external circular ribs form an annular recess $e^4$ in which engages a collar $i$ which can be turned in this recess by means of a lever $i'$. This collar is provided with an inclined groove $i^2$ in which engages the head of a pawl $i^3$; the latter, by means of side rollers $i^4$ is exposed to the action of a leaf spring $i^5$ resting against the bottom of the recess $e^4$, traversed by the rod of the said pawl which, when at rest, fits in the space $e^5$. A roller $i^6$ journaled in the recess $e^4$, between stops $i^7$, $i^8$ upon the collar $i$, serves to limit the movement of the collar in the recess $e^4$. The free ends of the blades $f^2$ are beveled or inclined (Fig. 1) and rest on a corresponding surface upon the interior of a ring $f^3$ held by ball-bearing supports $f^4$ (Fig. 6). The whole system of the two matrices is held elastically against the mouth of the press by stay-bolts $j$ passing side lugs $c^4$ at the sides of the outer casing $c$. Crowns or rings $j'\ j^2$ are mounted by means of ball bearings on these bolts, the one $j'$ being mounted in front of the worm $a$ and the other $j^2$ behind the part $e$. Between the part $e$ and the end of the bolts $j$, are arranged coil springs $j^3$ the tension of which can be regulated by nuts. These springs permit of a longitudinal displacement of the ring $f^3$ when the pressure of the material at the mouth of the press exceeds the pressure determined by the tension of the said springs. In this arrangement the material carried along by the rotating screw is able to cause the matrix $d$ to rotate with it, the latter carrying with it the plate $e'$, the part $e$ and the matrix extension F. When the briquet is molded the lever $i'$ is moved by hand or automatically by any suitable means in the direction of the arrow $x$ (Fig. 5). The first movement will, by means of the groove $i^2$, depress the pawl $i^3$ and cause it to engage between two ribs $e^2$; the stop $i^7$ then encounters the roller $i^6$ and from this moment the part $e$ together with the matrix $d$ and the matrix-extension F will be rotated by the lever $i'$ at a speed greater than that of the rotation of the material at the mouth of the press thereby causing at this spot the cutting-off of the briquet. It will be seen that it is preferable to move the lever $i^2$ in an opposite direction to the rotation of the material because in this manner the relative speed of the material at the mouth of the press and of the matrix in front of the same is increased. It must be observed that the arrangement shown is only given for the sake of example showing one method of cutting-off the briquets by a sudden differential rotation of the matrix with respect to the rotation of the material at its outlet from the mouth of the press. If it is supposed that for some reason or other the material accidentally chokes up the mouth of the press and if under these circumstances the matrix $d$ were rigidly fitted to the mouth of the press, then the pressure of the press being unlimited would result in the bursting of the latter; but owing to the said matrix being adjustably mounted on the press so that it can yield longitudinally and inasmuch as the variable pressure extension F (Fig. 7) can yield laterally, the resistance to the forward movement to the material is reduced. When, however, the mold yields longitudinally, a gap will be formed between the mouth of the press and the mouth of the mold $d$ through which the material can escape. This material is automatically returned to the press by de-centered blades $a^3$ at the mouth of the press. These blades $a^3$ are fixed and arranged beside the oppositely directed blades $d^2$ upon the mouth of the matrix $d$, the blades $d^2$ rotating together with the mold $d$. By the combination of these blades the material which has escaped between them is conducted to the opening $a^4$ and returned to the press. The extension F is arranged to yield laterally in case of excessive pressure as already known in molds for briquets and the like, but instead of yielding at one or two sides only and thus leaving a number of rigid angles, the extension is made to yield all around its periphery and particularly at the angles. The lateral yielding of the extension F is connected to the longitudinal displacement of the thread mold $d$ because the plates $f^2$ forming the walls of the mold extension F are inclined outwardly at the ends opposite to their pivots so as to bear against the beveled ring $f^3$. When the thread mold $d$ yields longitudinally it carries with it the mold extension F while the ring $f^3$ remains stationary. Consequently the inclined extremities of the plates $f^2$ no longer bear upon the rings $f^3$ and the said plates may therefore yield laterally. As soon as the pressure becomes normal again the spring $j^3$ forces the mouth of the mold into contact with the mouth of the press and the beveled ring $f^3$ closes the blades $f^2$.

It is evident that the matrix and the extension may be of other shapes and arrangements to those described above (Figs. 1–6). For example they may (Figs. 7 and 8) be of polygonal cross-section, the walls $f^2$ of the extension being pivoted as before stated. The walls $f^2$ are held tightly together by a pneumatic device or by springs as for example $f^4$ which maintain the opposite pairs at a definite pressure determined by the adjustable tension of these springs. In this case the extension F yields laterally independently of the longitudinal displacement of the matrix therewith. The matrix extension may consist of numerous sections (Fig. 9) of varied shapes with movable outer walls. The same also applies to the matrix which will be of corresponding cross-section.

It is evident that the arrangement shown can be applied in principle to any molding device or to any kind of press.

Having thus described my invention, what I claim as such and desire to secure by Letters Patent is:—

1. A molding press embodying a conoidal feeding screw, a matrix into which the material is fed from said screw, and an extension beyond the matrix which is adapted to yield longitudinally under excessive pressure of the material which is fed thereto.

2. A molding press embodying a conoidal feeding screw, a matrix into which the material is fed from said screw, and an extension beyond the matrix yieldable longitudinally and circumferentially under excessive pressure of the material fed thereto.

3. A molding press embodying a conoidal feeding screw, a matrix into which the material is fed from said screw, and a polygonal extension beyond the matrix yieldable longitudinally and circumferentially under excessive pressure of the material fed thereto, and which comprises a plurality of blades, each movable independently of the others in the circumferentially yieldable movement of the extension.

4. A molding press embodying a conoidal feeding screw, a matrix into which material is fed from said screw, and which comprises an inextensible part adjacent to the screw, and a part beyond said first named part and which is longitudinally and circumferentially extensible, and means to exert a definite adjustable pressure upon said last named part whereby to prevent the same from yielding except under excessive pressure of the material fed thereto.

5. A molding press embodying a conoidal feed screw for feeding material from the mouth of the press, and a matrix normally positioned against the mouth of the press and having movement with respect thereto whereby to separate therefrom under an excessive pressure of the material fed thereto, and means to automatically return to the press any and all of the material which may escape between the said matrix and the said mouth of the press.

6. A molding press embodying a conoidal feed screw, a matrix into which the material is fed from said screw, a matrix extension comprising a plurality of blades which are pivoted to the matrix at one end and are provided at their free ends with outwardly inclined portions, a ring having a beveled inner face surrounding and bearing upon the said outwardly inclined end portions of the said mold blades, and means whereby to support the said matrix and the said matrix extension adjacent the said feed screw in such manner as to permit of longitudinal displacement of the former with respect to the press and permit of the circumferential enlargement of the said mold extension.

7. A molding press embodying a conoidal feed screw for feeding material from the mouth of the press, and a matrix normally positioned against the mouth of the press and having movement with respect thereto whereby to separate therefrom under an excessive pressure of the material fed to the mold, the adjoining mouths of the press and the matrix being provided with oppositely directed de-centered blades whereby to return to the press any and all of the material which may escape between the matrix mouth and the press mouth when the matrix is moved away from the press.

8. A molding press embodying a conoidal feed screw for feeding material from the mouth of the press, a matrix journaled against the mouth of the press, and means whereby to impart to the matrix a sudden relative rotation with respect to the mouth of the press, whereby to cut off the material within the matrix.

9. A molding press embodying a conoidal feed screw for feeding material from the mouth of the press, a matrix journaled against the mouth of the press, and means to impart to the matrix a sudden relative rotation with respect to the mouth of the press, whereby to cut off the material within the matrix, embodying an exterior lever having a clutch connection with the matrix.

In testimony whereof I have signed my name to this specification, in the presence of two subscribing witnesses.

LADISLAS PENKALA.

Witnesses:
CHARLES DONY,
LEON PEILLET.

Copies of this patent may be obtained for five cents each, by addressing the "Commissioner of Patents, Washington, D. C."